(12) United States Patent
Whitley et al.

(10) Patent No.: US 7,862,645 B2
(45) Date of Patent: Jan. 4, 2011

(54) REMOVAL OF GASEOUS CONTAMINANTS FROM ARGON

(75) Inventors: Roger Dean Whitley, Allentown, PA (US); Edward Landis Weist, Jr., Macungie, PA (US); Annemarie Ott Weist, Macungie, PA (US); Steven Ray Auvil, Macungie, PA (US)

(73) Assignee: Air Products and Chemicals, Inc., Allentown, PA (US)

(*) Notice: Subject to any disclaimer, the term of this patent is extended or adjusted under 35 U.S.C. 154(b) by 407 days.

(21) Appl. No.: 12/024,168

(22) Filed: Feb. 1, 2008

(65) Prior Publication Data

US 2009/0193967 A1    Aug. 6, 2009

(51) Int. Cl.
*B01D 53/047* (2006.01)

(52) U.S. Cl. .................. 95/96; 95/130; 95/148; 96/130; 422/169

(58) Field of Classification Search .......... 95/96, 95/100, 103, 130, 148; 422/169
See application file for complete search history.

(56) References Cited

U.S. PATENT DOCUMENTS

| | | | |
|---|---|---|---|
| 4,859,217 A | 8/1989 | Chao | |
| 5,106,399 A | 4/1992 | Fisher | |
| 5,125,934 A | 6/1992 | Krishnamurthy et al. | |
| 5,220,797 A | 6/1993 | Krishnamurthy et al. | |
| 5,254,154 A | 10/1993 | Gauthier et al. | |
| 5,706,674 A | 1/1998 | Hsiung et al. | |
| 5,730,003 A | 3/1998 | Nguyen et al. | |
| 6,315,818 B1 | 11/2001 | Monereau | |
| 6,336,956 B1* | 1/2002 | Moreau et al. ............... 95/96 |
| 6,500,235 B2 | 12/2002 | Zhong et al. | |
| 6,838,066 B2 | 1/2005 | Rao | |
| 6,923,844 B2 | 8/2005 | Urakami et al. | |
| 6,955,711 B2 | 10/2005 | Kawai et al. | |
| 7,258,725 B2 | 8/2007 | Ohmi et al. | |
| 7,501,009 B2* | 3/2009 | Graham et al. ............... 95/98 |
| 2004/0237789 A1 | 12/2004 | Baksh et al. | |
| 2006/0165573 A1 | 7/2006 | Ohmi et al. | |

FOREIGN PATENT DOCUMENTS

| | | |
|---|---|---|
| DE | 197 08 025 A1 | 9/1997 |
| EP | 0 538 140 A1 | 4/1993 |
| EP | 0 832 678 A | 4/1998 |
| EP | 1 023 934 B1 | 8/2000 |
| EP | 1 219 339 A | 7/2002 |
| EP | 1 495 793 A1 | 12/2005 |
| EP | 1 832 330 A | 9/2007 |
| GB | 2 227 685 A | 8/1990 |
| JP | 62 119104 A | 5/1987 |
| JP | 6-24962 | 4/1994 |

* cited by examiner

*Primary Examiner*—Robert A Hopkins
(74) *Attorney, Agent, or Firm*—Anne B. Kiernan

(57) ABSTRACT

Method for argon recovery that comprises (a) providing a feed gas mixture comprising argon and nitrogen; (b) contacting at least a portion of the feed gas mixture with a nitrogen-selective adsorbent in a cyclic pressure swing adsorption process and adsorbing at least a portion of the nitrogen on the adsorbent in a first pressure range above 100 psia to provide a purified argon product and an adsorbent comprising adsorbed nitrogen; and (c) desorbing the adsorbed nitrogen in one or more regeneration steps effected in a second pressure range between atmospheric pressure and a super-atmospheric pressure below any pressure in the first pressure range, inclusive; wherein the cyclic pressure swing adsorption process is effected at an average operating temperature of at least about 0° C.

31 Claims, 2 Drawing Sheets

REMOVAL OF GASEOUS CONTAMINANTS FROM ARGON

BACKGROUND OF THE INVENTION

Argon is used widely in steel manufacturing, cutting and welding of metals, metal sintering, electronic component fabrication, and other processes that require the a non-reactive gas for blanketing, purging, and heat transfer purposes. After use in these applications, the argon may contain contaminants such as hydrocarbons, carbon oxides, hydrogen, nitrogen, oxygen, water, and particulate material. Because argon is a relatively expensive gas, it is economically desirable in many cases to purify the contaminated argon and recycle the purified gas to the argon-using process.

Argon can be purified for recycle by combinations of gas processing steps including filtration, condensation, cryogenic distillation, pressure swing adsorption or pressure vacuum swing adsorption, temperature swing adsorption, catalytic oxidation, and gettering. The specific combination of processing steps will depend on the contaminants present in the crude argon to be purified, the concentration of the contaminants, and the required purity of the recycled gas. It is desirable to minimize the complexity of the argon purification system and utilize only those steps required to meet recycled gas purity requirements at acceptable cost.

There is a need in the art for improved argon recovery processes that provide high purity argon for recycle using compact and efficient equipment capable of high argon recovery at low cost. This need is addressed by the embodiments of the present invention described below and defined by the claims that follow.

BRIEF SUMMARY OF THE INVENTION

An embodiment of the invention relates to a method for argon recovery comprising
  (a) providing a feed gas mixture comprising argon and nitrogen;
  (b) contacting at least a portion of the feed gas mixture with a nitrogen-selective adsorbent in a cyclic pressure swing adsorption process and adsorbing at least a portion of the nitrogen on the adsorbent in a first pressure range above 100 psia to provide a purified argon product and an adsorbent comprising adsorbed nitrogen; and
  (c) desorbing the adsorbed nitrogen in one or more regeneration steps effected in a second pressure range between atmospheric pressure and a super-atmospheric pressure below any pressure in the first pressure range, inclusive;

wherein the cyclic pressure swing adsorption process is effected at an average operating temperature of at least about 0° C.

Another embodiment of the invention relates to a method for argon recovery comprising
  (a) providing a feed gas mixture comprising argon and methane;
  (b) contacting at least a portion of the feed gas mixture with a methane-selective adsorbent in a cyclic pressure swing adsorption process and adsorbing at least a portion of the methane on the adsorbent in a first pressure range above atmospheric pressure to provide a purified argon product and an adsorbent comprising adsorbed methane; and
  (c) desorbing the adsorbed methane in one or more regeneration steps effected in a second pressure range between atmospheric pressure and a super-atmospheric pressure below any pressure in the first pressure range, inclusive;

wherein the cyclic pressure swing adsorption process is effected at an average operating temperature of at least about 0° C.

An alternative embodiment of the invention includes a method for argon recovery comprising
  (a) providing a feed gas mixture comprising argon, the contaminants nitrogen, oxygen, and one or more hydrocarbons each having one or two carbon atoms, and the contaminant or contaminants hydrogen and/or carbon monoxide;
  (b) removing at least a portion of the oxygen by catalytic reaction with hydrogen and/or methane to yield an oxygen-depleted gas enriched in water and/or carbon dioxide;
  (c) contacting the oxygen-depleted gas with a bed of getter material wherein at least a portion of the hydrogen and/or carbon monoxide is removed to yield an intermediate gas; and
  (d) contacting the intermediate gas mixture with adsorbent material in a cyclic pressure swing adsorption process and selectively adsorbing at least a portion of the contaminant gases in a first pressure range above atmospheric pressure to provide a purified argon product and adsorbent material comprising adsorbed contaminants; and
  (c) regenerating the adsorbent material comprising adsorbed contaminants in one or more regeneration steps effected in a second pressure range between atmospheric pressure and a super-atmospheric pressure below any pressure in the first pressure range, inclusive;

wherein the cyclic pressure swing adsorption process is effected at an average operating temperature of at least about 0° C.

Another alternative embodiment of the invention relates to an apparatus for argon recovery comprising a pressure swing adsorption system having an inlet, an outlet, and a plurality of parallel adsorber vessels, each adsorber vessel containing adsorbent material adapted to be selective for the adsorption of nitrogen from a mixture comprising nitrogen and argon and/or selective for the adsorption of methane from a mixture comprising nitrogen and methane, wherein the pressure swing adsorption system is adapted to effect the cyclic steps of (1) adsorbing nitrogen and/or methane on the adsorbent material in a first pressure range above 100 psia to provide a purified argon product and an adsorbent comprising adsorbed nitrogen and/or adsorbed methane and (2) regenerating the adsorbent by desorbing the adsorbed nitrogen and/or the adsorbed methane in a second pressure range between atmospheric pressure and a super-atmospheric pressure below any pressure in the first pressure range, inclusive, to yield reject gas containing argon and desorbed nitrogen and/or methane, and wherein the pressure swing adsorption system is adapted to operate at an average operating temperature of at least about 0° C.

A further embodiment includes an apparatus for argon recovery comprising
  (a) a catalytic oxidation reactor having an inlet, an outlet, and a catalytic material adapted to promote the reaction of oxygen with hydrogen and/or methane;
  (b) a getter vessel having an inlet, an outlet, and a bed of getter material adapted to chemisorb hydrogen and/or carbon monoxide, wherein the inlet of the vessel is in flow communication with the outlet of the catalytic oxidation reactor; and (c) a pressure swing adsorption system having an inlet in flow communication with the outlet of the getter vessel, wherein the pressure swing adsorption system comprises a plurality of parallel adsorber vessels, each adsorber vessel containing adsorbent material selective for the adsorption of gaseous contaminants from argon, wherein the pressure swing adsorption system is adapted to effect the cyclic steps of (1) adsorbing gaseous contaminants on the adsorbent material in a first pressure range above atmospheric pressure to provide a purified argon product and an adsorbent comprising adsorbed contaminants and (2) regenerating the adsorbent by desorbing the adsorbed contaminants in a second pressure range between atmospheric pressure and a super-atmospheric pressure below any pressure in the first pressure range, inclusive, to yield reject gas comprising argon and desorbed contaminants, and wherein the pressure swing adsorption system is adapted to operate at an average operating temperature of at least about 0° C.

DETAILED DESCRIPTION OF THE INVENTION

Figure 1:
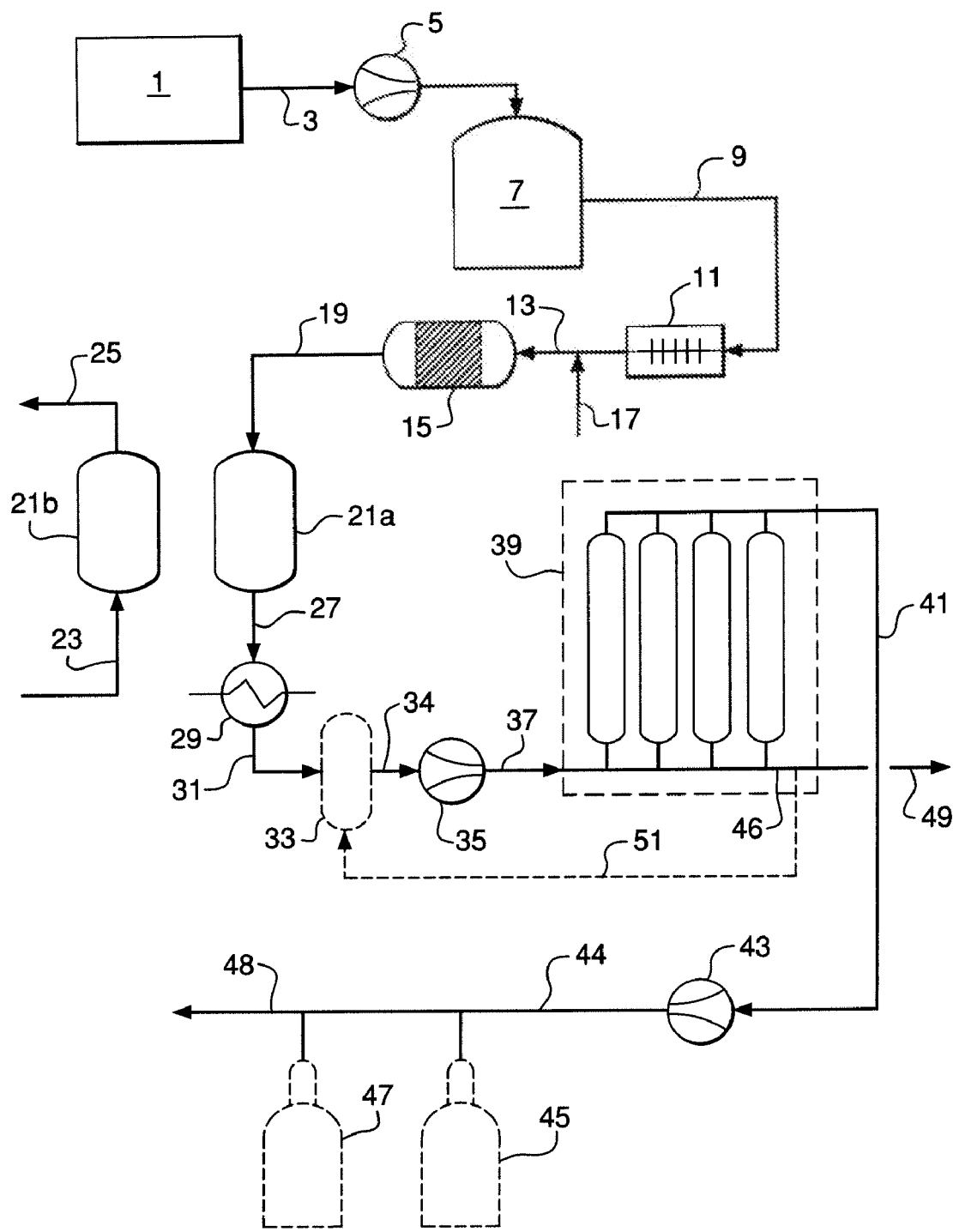
FIG. 1 is a schematic flow diagram of an embodiment of the invention.

The embodiments of the invention described below comprise methods for treating waste argon collected from an argon-using process by removing the contaminants from the waste argon to produce a recovered argon product of sufficient purity for recycle to the argon-using process. Each of the embodiments utilizes a pressure swing adsorption (PSA) system operating at ambient temperature wherein certain contaminants including nitrogen and/or methane are adsorbed in a PSA cycle operating at pressures in a range between atmospheric pressure and a maximum super-atmospheric pressure, inclusive. Sub-atmospheric evacuation is not used and a vacuum blower system is not required.

The waste argon may contain any of various contaminants such as hydrocarbons, carbon oxides, hydrogen, nitrogen, oxygen, water, and particulate material. Some of these contaminants can be removed by PSA processes, while others must be removed by chemical oxidation and/or chemisorption. The specific combination of PSA, chemical oxidation, and chemisorption processes will depend on the contaminants present in the crude argon to be purified, the concentration of the contaminants, and the required purity of the recycled gas.

The term "pressure swing adsorption" (PSA) as used herein applies to any cyclic adsorptive separation system operating between a maximum pressure and a minimum pressure wherein the maximum pressure is super-atmospheric and the minimum pressure is equal to or greater than atmospheric pressure.

The average operating temperature of a pressure swing adsorption process is defined as the sum of the lowest and highest temperatures which occur in an adsorber vessel over the course of a complete cycle divided by two.

The pressure range of an adsorption step (i.e., a feed/make product step) in a PSA process is defined by the highest and lowest pressure at the feed end of an adsorber vessel during the adsorption step while feed gas is introduced into the adsorber vessel.

The pressure range of the regeneration steps in a PSA process is defined by the highest and lowest pressure at the feed end of an adsorber vessel during the regeneration steps while reject gas is withdrawn from the adsorber vessel.

Reject gas is defined as any gas withdrawn from the feed end of an adsorber vessel during regeneration including blowdown and purge steps. At least a portion of the reject gas is discharged from the PSA system as a waste stream. A portion of the reject gas may be recycled to the PSA feed to improve product recovery.

A getter material is defined as a material which selectively removes a species from a mixture through an attraction stronger than physisorption. The getter material may bind or retain gas molecules by chemisorption.

The indefinite articles "a" and "an" as used herein mean one or more when applied to any feature in embodiments of the present invention described in the specification and claims. The use of "a" and "an" does not limit the meaning to a single feature unless such a limit is specifically stated. The definite article "the" preceding singular or plural nouns or noun phrases denotes a particular specified feature or particular specified features and may have a singular or plural connotation depending upon the context in which it is used. The adjective "any" means one, some, or all indiscriminately of whatever quantity. The term "and/or" placed between a first entity and a second entity means one of (1) the first entity, (2) the second entity, and (3) the first entity and the second entity.

A first embodiment of the invention is an exemplary process illustrated in FIG. 1. Argon-using process 1 generates waste argon withdrawn from the process via line 3 by blower 5. If the waste argon is produced at a sufficiently high pressure, blower 5 is not required. If the argon-using process generates waste argon intermittently or if the flow rate of the waste argon varies significantly, the waste argon is introduced into optional gas holding tank 7. If the flow rate of the waste argon is relatively constant, gas holding tank 7 may not be required.

The waste argon may contain any of the contaminants described above, and the concentration of each contaminant may be between 0 and 1000 ppmv. In some cases, the nitrogen concentration may be greater than 1000 ppmv and may range up to 5 vol %. Recovered purified argon typically should have a total impurity level below about 30 ppmv, and concentrations below 5 ppmv may be required in some applications.

The waste argon flows from gas holding tank 7 via line 9 to process heater 11, where the gas is heated to between about 200° F. and about 500° F. The heated gas flows via line 13 to deoxo reactor 15 containing a catalyst such as Pd or Pt that promotes the reaction of oxygen present in the waste argon with hydrogen, carbon monoxide, and other combustible contaminants also present in the waste argon. If there is less than a stoichiometric amount of combustibles in the waste argon for reacting all the oxygen, either hydrogen or preferably methane can be added to the waste argon via line 17. Depending on the amount of heat generated by the oxidation process in deoxo reactor 15, process heater 11 may precede deoxo reactor 15 as shown, may follow deoxo reactor 15, or in certain cases may not be required at all. The intermediate waste argon leaving deoxo reactor 15 via line 19 contains essentially no oxygen and contains additional water and/or carbon dioxide generated in the oxidation reactions.

The intermediate waste argon is processed in a getter system consisting of getter vessels 21a and 21b containing reactive material that chemisorbs hydrogen and carbon monoxide. Getter vessel 21a is onstream as shown while getter vessel 21b is offstream and is being regenerated. The getter material, for example oxidized copper on a porous support such as alumina, removes the carbon monoxide from the stream by chemisorption and conversion to carbon dioxide. Also, at least a portion of the hydrogen in the intermediate waste argon is chemisorbed and oxidized to form water.

The temperature for optimum getter performance typically is about 450° F., and this may be used as the temperature set point for process heater 11. If there is significant combustion in deoxo reactor 15, the set point would be lower due to the exothermic nature of the oxidation reactions in deoxo reactor 15. If the process heater 11 is located downstream of deoxo reactor 15, the inlet temperature to the heater will depend on the amount of combustion in deoxo reactor 15, but the outlet temperature from the heater will depend on the temperature required in getter vessel 21b for hydrogen and/or carbon monoxide removal in the getter vessel.

The regeneration of offline getter vessel 21b is effected by re-oxidizing the copper, which was reduced in the previous cycle, by oxidizing the chemisorbed hydrogen and/or carbon monoxide. This re-oxidation is accomplished by passing a regeneration gas via line 23 over the reduced copper in getter vessel 21b. The regeneration gas is a dilute mixture of oxygen in an inert carrier gas such as nitrogen or argon; if the overall recovery of argon is important, nitrogen would be the preferred carrier gas. Oxygen concentrations in the regeneration gas may range from 0.5 to 20.9 vol %. It is beneficial to begin regeneration with low concentration of oxygen and increase the concentration as the regeneration continues. The inert carrier gas and the unreacted oxygen exit getter vessel 21b via line 25.

The further treated waste argon leaving getter vessel 21a via line 27 is essentially free of oxygen, hydrogen, and carbon monoxide. The water and carbon dioxide levels in the effluent from getter vessel 21a are higher than those in the feed gas and are directly related to the amount of hydrogen and carbon monoxide removed in getter vessel 21a. Significant amounts of methane in the waste argon will not be removed in getter vessel 21a at temperatures below 500° F. If present, ethylene will be converted to water and carbon dioxide at about 450° F. Nitrogen present in the original waste argon will be essentially unaffected in deoxo reactor 15 and getter vessel 21a.

The further treated waste argon leaving getter vessel 21b flows via line 27 to heat exchanger 29 to reduce the temperature of the gas before further processing. Process heater 11 and heat exchanger 29 may be replaced by an economizer heat exchanger and small trim heater if desired (not shown).

The further treated waste argon exits heat exchanger 29 via line 31 to optional surge tank 33 (described below), exits via line 34, and is compressed to a pressure between about 100 and about 300 psig in compressor 35. The compressed gas flows via line 37 to PSA system 39 where the remaining impurities are adsorbed from the argon. The specific valve and piping configurations used in PSA system 39 are not shown and may comprise any configurations known in the art. Purified argon is withdrawn via line 41 with a total impurity level below about 30 ppmv, and possibly below 5 ppmv if required. The pressure of the product argon is slightly below the feed pressure to the PSA system; if a higher pressure is required for recycle, the purified argon can be compressed in optional product compressor 43. Argon-using process 1 may require a peak argon flow above that provided by PSA system 39, and/or may require high pressure storage. In these cases, compressed argon may be stored in optional product cylinders 45 and 47. Argon is returned via line 48 to argon-using process 1.

PSA waste gas containing desorbed contaminants exits via line 46. This waste gas contains some argon with desorbed nitrogen, water, carbon dioxide, and possibly methane if present in the feed to the PSA system. A portion of this waste gas may be recycled via line 51 and optional surge tank 33 to the PSA system to improve argon recovery, and the remaining waste gas is purged via vent line 49.

Figure 2:
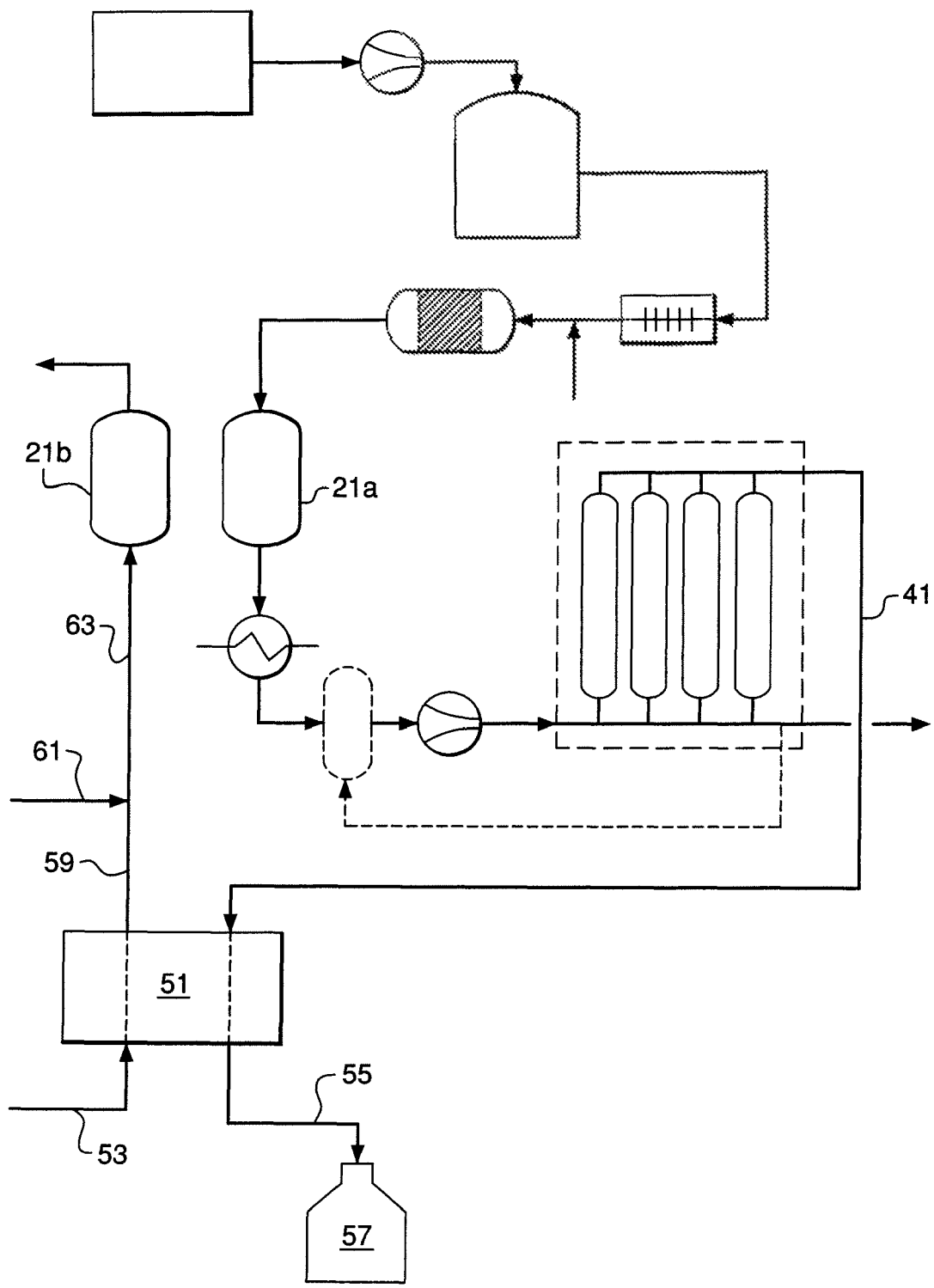
FIG. 2 is a schematic flow diagram of an alternative embodiment of the invention.

An alternative embodiment is shown in FIG. 2. In this embodiment, product compressor 43 and product cylinders 45 and 47 are not used. Product argon flows via line 41 to heat exchanger 51 where it is liquefied by vaporizing liquid nitrogen supplied via line 53. Liquefied argon flows via line 55 to cryogenic liquid storage vessel 57 and vaporized nitrogen exits via line 59. The liquefied argon is vaporized (not shown) and sent to argon-using process 1 as needed. If desired, the liquefied argon may be pressurized by pumping (not shown) before vaporization in order to provide argon at high pressure to argon-using process 1. Some or all of the vaporized nitrogen in line 59 may be withdrawn (not shown) for other applications. Alternatively or additionally, some or all of the vaporized nitrogen in line 59 may be taken via line 63 and used in the regeneration of getter vessels 21a and 21b. A regeneration gas such as air or hydrogen may added via line 61 depending on the type of contaminant captured on the getter.

PSA system 39 comprises a plurality of adsorber vessels each containing an adsorbent selective for the adsorption of nitrogen from argon. Appropriate adsorbents may include, but are not limited to, X-type zeolites such as CaX, AgLiX, LiX, and LiNaX, wherein the X-type zeolite may have a silicon to aluminum ratio between 1.0 and 1.25. Li-exchanged zeolites are particularly useful when the Li exchange level is at least about 70%. Additional adsorbent types may be used in each adsorber vessel in separate layers for the adsorption of other contaminants in the argon. For example, a layer of activated alumina or silica gel or type NaX zeolite may be used to adsorb water and carbon dioxide (some or all of which is formed in the deoxo and/or getter steps). A layer of activated carbon may be used to adsorb methane and other hydrocarbons not removed in the deoxo and getter steps. The layer order from the feed end of the vessel may be a first layer of alumina or silica gel, a second layer of activated carbon and/or NaX, and a third layer comprising any of CaX, LiNaX, and AgLiX.

Any plural number of adsorber vessels may be used and may be operated in any appropriate PSA cycle that will yield the desired product purity and product recovery. The PSA cycle is operated by adsorption at pressures in a first pressure range above atmospheric pressure and by regeneration in a second pressure range between atmospheric pressure and a super-atmospheric pressure below any pressure in the first pressure range, inclusive. In one embodiment, adsorption is effected in a pressure range above 100 psia and may be effected in a specific adsorption pressure range between about 100 psia and about 300 psia. The PSA process may be operated at an average operating temperature of at least about 0° C.

The PSA system may utilize any piping and valve configuration known in the art for directing gas flow to and from each adsorber vessel to carry out the selected cycle steps. These include at least the steps of adsorption/make product, depressurization for waste gas discharge at or above atmospheric pressure, and repressurization. Additional steps may include, for example, any of (1) depressurization and gas transfer from one adsorber vessel to repressurize another adsorber vessel, (2) depressurization and gas transfer from one adsorber vessel to purge another adsorber vessel at or above atmospheric pressure, and (3) repressurization with product gas and/or feed gas.

Traditional multiple-valve manifold and piping systems may be used for directing gas flow to and from each adsorber vessel to carry out the selected cycle steps. Alternatively, rotary valves and associated piping may be used to control gas flow to and from the feed and product ends of the adsorber vessels to effect the cycle steps.

An exemplary PSA process that may be used in embodiments of the invention operates with four adsorber beds each containing the zeolite adsorbent LiLSX to remove nitrogen and optionally methane from argon. Each bed is subjected in turn to eight cycle steps as summarized in Table 1 and the cycle chart of Table 2.

TABLE 1

Cycle Step Descriptions

| Step No. | Cycle Step | Description |
| --- | --- | --- |
| 1 | Feed/Make Product + Provide Product Repressurization (1) | Introduce feed gas into the feed end of the first bed, withdraw product gas from the product end of the first bed, and use a portion of the product gas for repressurizing a second bed undergoing step 7 |
| 2 | Feed/Make Product + Provide Product Repressurization (2) | Introduce feed gas into the feed end of the first bed, withdraw product gas from the product end of the first bed, and use a portion of the product gas for repressurizing a second bed undergoing step 8 |
| 3 | Provide Pressure Equalization | Withdraw depressurization gas from the product end of the first bed and introduce the withdrawn gas into the product end of a third bed undergoing step 7 |
| 4 | Provide Purge | Withdraw depressurization gas from the product end of the first bed and introduce the withdrawn gas into the product end of a fourth bed undergoing step 6 |
| 5 | Blowdown | Withdraw depressurization gas from the feed end of the first bed and discharge as waste gas above atmospheric pressure |
| 6 | Receive Purge | Introduce purge gas into the product end of the first bed wherein the purge gas is provided from the second bed undergoing step 4 and discharge purge effluent waste gas at or above atmospheric pressure |
| 7 | Receive Pressure Equalization | Pressurize the first bed by introducing repressurization gas into the product end of the first bed wherein the repressurization gas is provided by the third bed undergoing step 3 and the fourth bed undergoing step 1 into the product end of the first bed |
| 8 | Receive Product Repressurization | Pressurize the first bed by introducing product gas obtained from the fourth bed undergoing step 2 into the product end of the first bed |

TABLE 2

PSA Cycle Chart

| Bed | Cycle Step | | | | | | | |
| --- | --- | --- | --- | --- | --- | --- | --- | --- |
| 1 | 1 | 2 | 3 | 4 | 5 | 6 | 7 | 8 |
| 2 | 7 | 8 | 1 | 2 | 3 | 4 | 5 | 6 |
| 3 | 5 | 6 | 7 | 8 | 1 | 2 | 3 | 4 |
| 4 | 3 | 4 | 5 | 6 | 7 | 8 | 1 | 2 |
| Time Period | T1 | T2 | T3 | T4 | T5 | T6 | T7 | T8 |

Example 1

The four-bed PSA process described above was simulated using SIMPAC, which is a detailed adsorption process simulator. SIMPAC considers multicomponent adsorption isotherms, various mass transfer modes, numerous adsorbent layers, and general process flowsheeting. More details about SIMPAC are discussed in Kumar et al., *Chemical Engineering Science*, Volume 49, Number 18, pages 3115-3125.

An argon stream containing 500 ppmv nitrogen and 85 ppmv methane at 100° F. and 15.5 atma is fed to the PSA system at a rate of 9.50 lb mole per hour. Each adsorber vessel in the PSA system has a diameter of 0.48 ft and contains 32.8 lbs of LiLSX zeolite adsorbent with a bed depth of 5 ft. The PSA system is operated according to the cycle of Tables 1 and 2 wherein each process step has an elapsed time of 15 seconds.

The PSA cycle steps are operated between a maximum pressure of 14.6 atma and a minimum pressure of 1.6 atma, and the average wall temperature of the adsorber vessels is 90° F. Of the PSA waste gas, 44.8 vol % is recycled to the feed of the PSA.

A purified argon product containing 99.999 vol % argon is withdrawn at a flow rate of 9.09 lb mole per hour to yield an argon recovery of 95.7% for the PSA.

Example 2

Hot isostatic pressing (HIP or HIPping) is a forming process combining simultaneous heat and pressure to consolidate metal and/or ceramic powders. Sinter HIPping is a combined HIPping and sintering process that facilitates sintering in the final stages of hot isostatic pressing or densification in the presence of a selected high pressure gas or gas mixture. Both hydrogen and argon are used at various stages in the production of metal powder compacts. The sintering process typically comprises the two steps of dewaxing and sintering. The dewaxing step is carried out in a soft vacuum with a low partial pressure of hydrogen, which facilitates complete removal of the wax. In the sintering step, the furnace uses an argon atmosphere, and the HIPping step is performed with high-pressure argon at high temperatures. In the dewaxing of sintered parts, the organic binder is vaporized and some of the organic compounds are cracked into smaller hydrocarbons and CO. The quality of the sintered parts is highly dependent on the purity of the process gas. For example, any reactive species such as CO and $N_2$ can react with the sintered parts and adversely affect the properties of the final parts.

Argon offgas recovered from the process contains impurities that must be removed before the argon can be recycled for use in a subsequent process or batch. In the sinter HIPping process, these impurities typically include CO, $H_2$, $N_2$, $CH_4$, $C_2H_4$ and $O_2$. The amount of each impurity will depend on the specific wax, metal, and steps used in the process.

The purification of a typical argon offgas recovered from sinter HIPping was simulated by heat and material balance using the process of FIG. 1. The hydrogen and carbon monoxide are oxidized to water and carbon dioxide in the getter system. The four-bed PSA system and cycle described above were used in the simulation, and a portion of the PSA waste gas is recycled to the PSA feed to improve argon recovery. Each adsorber vessel is 0.48 ft in diameter and contains one ft of alumina and four ft of LiX. The PSA cycle steps are operated between a maximum pressure of 14.6 atma and a minimum pressure of 1.6 atma, and the average wall temperature of the adsorber vessels is 90° F. 90% of the PSA waste gas (purge effluent) is recycled and combined with the PSA feed.

The following process parameters were used in the simulation:
(1) a once-through argon recovery of 65%;
(2) once-through PSA removals for nitrogen, oxygen, carbon monoxide, water, carbon dioxide, methane, and ethylene of 99.9997%, 50.0%, 99.5%, 99.997%, 99.998%, 99.998%, and 99.0%, respectively;
(3) removals in the deoxo and getter steps of 99%, 99%, essentially 100%, and 50% for hydrogen, carbon monoxide, oxygen, and ethylene, respectively;
(4) 75% of the oxygen combusts with carbon monoxide and the remaining oxygen combusts with hydrogen at 450° F. in the deoxo unit; and
(5) the waste argon pressure is 3 psig.

The details of the material balance calculations are shown in Table 3. The simulation resulted in a 95% argon recovery and a recovered argon purity of 99.9992 vol %.

While the present Example illustrates an embodiment of the invention as applied to argon offgas in the sinter HIPping process, embodiments of the invention also may be applied to purify argon offgas in other processes such as, for example, vacuum furnace cooling and argon oxygen decarburization (AOD).

Example 3

A pilot-scale experiment was conducted to demonstrate the purification of argon from a multicomponent feed mixture. The system was operated at an ambient temperature of 21° C. Each of four adsorber columns of 0.87 inches inside diameter by 5 ft in height was filled with 0.805 lb of LiX with a silicon to aluminum ratio of 1.0. The columns were operated in the pressure swing adsorption process as described by Tables 1 and 2. The cycle step times were controlled such that all steps, T1 through T8, were 30 seconds each. A gas mixture of 0.1% ethylene, 0.1% methane, 0.5% carbon dioxide, 0.5% nitrogen, and 98.8% argon was fed to the adsorber columns at 14.3 atma. The pressure during the receive purge step was controlled at 0.82 atma. The purge effluent (waste gas) was not recycled in this experiment. The gas mixture feed rate was 0.145 lbmol/hr, the nitrogen level in the argon product was 3.7 ppm, and 56% of the argon in the feed was recovered in the purified stream.

TABLE 3

Heat and Material Balance for Example 2

| | | Stream No. (FIG. 1) | | | | | | |
|---|---|---|---|---|---|---|---|---|
| | | 9 | 13 | 19 | 27 | 31 | 51 | 34 |
| Pressure | psia | 44.7 | 44.2 | 43.7 | 43.2 | 42.7 | 17.7 | 17.7 |
| | psig | 30 | 29.5 | 29 | 28.5 | 28 | 3 | 3 |
| Temperature | ° F. | 100 | 425 | 425 | 425 | 100 | 100 | 100 |
| MW | lb/lbmol | 39.91 | 39.91 | 39.91 | 39.93 | 39.93 | 39.52 | 39.79 |
| Total Flow | scfh | 3868 | 3868 | 3868 | 3868 | 3868 | 1846 | 5714 |
| | lbmol/hr | 10.00 | 10.00 | 10.00 | 10.00 | 10.00 | 4.77 | 14.77 |
| | lb/hr | 399 | 399 | 399 | 399 | 399 | 189 | 588 |
| Component | Ar | 3861 | 3861 | 3861 | 3861 | 3861 | 1782 | 5643 |
| Flow rates | $H_2$ | 2.0500 | 2.050 | 1.88 | 0.02 | 0 | 0.000 | 0.019 |
| (SCFH) | $N_2$ | 1.9339 | 1.934 | 1.93 | 1.93 | 2 | 17.851 | 19.785 |
| | $O_2$ | 0.1741 | 0.174 | 0.00 | 0.00 | 0 | 0.000 | 0.000 |
| | CO | 1.6632 | 1.663 | 1.49 | 0.01 | 0 | 0.131 | 0.146 |
| | $H_2O$ | 0.7736 | 0.774 | 0.95 | 2.80 | 3 | 25.882 | 28.687 |
| | $CO_2$ | 0 | 0.000 | 0.17 | 1.84 | 2 | 16.997 | 18.838 |
| | $CH_4$ | 0.3094 | 0.309 | 0.31 | 0.31 | 0 | 2.856 | 3.165 |
| | $C_2H_4$ | 0.1934 | 0.193 | 0.19 | 0.10 | 0 | 0.809 | 0.906 |
| | total | 3868 | 3868 | 3868 | 3868 | 3868 | 1846 | 5714 |
| Composition | Ar | 99.82 | 99.82 | 99.82 | 99.82 | 99.82 | 96.51 | 98.75 |
| Argon: | $H_2$ | 530 | 530 | 0 | 5 | 5 | 0 | 3.283 |
| vol % | $N_2$ | 500 | 500 | 500 | 500 | 500 | 9668 | 3462 |
| all other | $O_2$ | 45 | 45 | 0 | 0 | 0 | 0.00 | 0.00 |
| components: | CO | 430 | 430 | 385 | 4 | 4 | 70.81 | 25 |
| ppmv | $H_2O$ | 200 | 200 | 245 | 725 | 725 | 14018 | 5020 |
| | $CO_2$ | 0 | 0 | 45 | 476 | 476 | 9205 | 3297 |
| | $CH_4$ | 80 | 80 | 80 | 80 | 80 | 1547 | 554 |
| | $C_2H_4$ | 50 | 50 | 50 | 25 | 25 | 438 | 158 |
| | ppmv total | 1835 | 1835 | 1305 | 1815 | 1815 | 34946 | 12521 |

TABLE 3-continued

Heat and Material Balance for Example 2

| | | Stream No. (FIG. 1) | | | | |
|---|---|---|---|---|---|---|
| | | 37 | 41 | 44 | 46 | 49 |
| Pressure | psia | 214.7 | 213.7 | 1514.7 | 17.7 | 17.7 |
| | psig | 200 | 199 | 1500 | 3 | 3 |
| Temperature | °F. | 100 | 100 | 100 | 100 | 100 |
| MW | lb/lbmol | 39.79 | 39.95 | 39.95 | 39.52 | 39.52 |
| Total Flow | scfh | 5714 | 3668 | 3668 | 2046 | 200 |
| | lbmol/hr | 14.77 | 9.48 | 9.48 | 5.29 | 0.52 |
| | lb/hr | 588 | 379 | 379 | 209 | 20 |
| Component | Ar | 5642.65 | 3668 | 3668 | 1975 | 193 |
| Flow rates | $H_2$ | 0.02 | 0.019 | 0.0188 | 0.000 | 0.000 |
| (SCFH) | $N_2$ | 19.79 | 0.000 | 0.0001 | 19.785 | 1.934 |
| | $O_2$ | 0.00 | 0.000 | 0.0000 | 0.000 | 0.000 |
| | CO | 0.15 | 0.001 | 0.0007 | 0.145 | 0.014 |
| | $H_2O$ | 28.69 | 0.001 | 0.0009 | 28.686 | 2.804 |
| | $CO_2$ | 18.84 | 0.000 | 0.0004 | 18.838 | 1.841 |
| | $CH_4$ | 3.17 | 0.000 | 0.0001 | 3.165 | 0.309 |
| | $C_2H_4$ | 0.91 | 0.009 | 0.0091 | 0.897 | 0.088 |
| | total | 5714 | 3668 | 3668 | 2046 | 200 |
| Composition | Ar | 98.75 | 99.9992 | 99.9992 | 96.51 | 96.51 |
| Argon: | $H_2$ | 3.283 | 5.11 | 5.11 | 0.00 | 0.00 |
| vol % | $N_2$ | 3462 | 0.02 | 0.02 | 9667.98 | 9667.98 |
| all other | $O_2$ | 0.00 | 0.00 | 0.00 | 0.00 | 0.00 |
| components: | CO | 25 | 0.20 | 0.20 | 70.81 | 70.81 |
| ppmv | $H_2O$ | 5020 | 0.23 | 0.23 | 14018 | 14018 |
| | $CO_2$ | 3297 | 0.10 | 0.10 | 9205.22 | 9205.22 |
| | $CH_4$ | 554 | 0.02 | 0.02 | 1546.61 | 1546.61 |
| | $C_2H_4$ | 158 | 2.47 | 2.47 | 438.14 | 438.14 |
| | ppmv total | 12521 | 8 | 8 | 34946 | 34946 |

The invention claimed is:

1. A method for argon recovery comprising
(a) providing a feed gas mixture comprising argon and nitrogen;
(b) contacting at least a portion of the feed gas mixture with a nitrogen-selective adsorbent in a cyclic pressure swing adsorption process and adsorbing at least a portion of the nitrogen on the adsorbent in a first pressure range above 100 psia to provide a purified argon product and an adsorbent comprising adsorbed nitrogen; and
(c) desorbing the adsorbed nitrogen in one or more regeneration steps effected in a second pressure range between atmospheric pressure and a super-atmospheric pressure below any pressure in the first pressure range, inclusive;
wherein the cyclic pressure swing adsorption process is effected at an average operating temperature of at least about 0° C.

2. The method of claim 1 wherein the average operating temperature is in the range of about 15° C. to about 50° C.

3. The method of claim 1 wherein the first pressure range is between about 100 psia and about 300 psia.

4. The method of claim 1 wherein the nitrogen concentration in the feed gas mixture is between about 0.005 and about 5 volume %.

5. The method of claim 1 wherein the nitrogen-selective adsorbent is selected from the group consisting of CaX, LiNaX, LiX, and AgLiX, wherein the X-type zeolite has a silicon to aluminum ratio between 1.0 and 1.25.

6. The method of claim 1 comprising utilizing the purified argon product in a process which generates the feed gas mixture.

7. The method of claim 1 wherein a reject gas containing a portion of the argon in the feed gas mixture is produced in the one or more regeneration steps, and wherein a portion of the reject gas is recycled and combined with the feed gas mixture.

8. The method of claim 1 wherein the feed gas mixture comprises oxygen and wherein at least a portion of the oxygen is removed by catalytic reaction with hydrogen and/or methane prior to the pressure swing adsorption process.

9. The method of claim 1 wherein the feed gas mixture comprises hydrogen and/or carbon monoxide and wherein at least a portion of the hydrogen and/or carbon monoxide is removed by contact with a bed of getter material prior to the pressure swing adsorption process.

10. The method of claim 9 wherein the getter material is selected from the group consisting of copper on an alumina support and nickel on an alumina support.

11. The method of claim 1 wherein the feed gas mixture comprises oxygen and also comprises hydrogen and/or carbon monoxide, wherein at least a portion of the oxygen is removed by catalytic reaction with hydrogen and/or methane to yield an oxygen-depleted gas comprising water and/or carbon dioxide and also comprising hydrogen and/or carbon monoxide, and wherein the oxygen-depleted gas is contacted with a bed of getter material to remove at least a portion of the hydrogen and/or carbon monoxide prior to the pressure swing adsorption process.

12. The method of claim 11 comprising utilizing at least a portion of the purified argon product in a process which generates the feed gas mixture.

13. The method of claim 11 wherein the feed gas comprises one or more hydrocarbons each having one or two carbon atoms.

14. The method of claim 13 wherein the pressure swing adsorption process utilizes at least one adsorber vessel containing three layers of adsorbent material, the first layer comprising an adsorbent that selectively adsorbs water and/or carbon dioxide from argon, a second layer comprising an adsorbent that selectively adsorbs from argon carbon monoxide and/or carbon dioxide and/or one or more hydrocarbons each having one or two carbon atoms, and a third layer comprising an adsorbent that selectively adsorbs nitrogen from argon.

15. The method of claim 14 wherein the adsorbent material in the first layer is selected from the group consisting of alumina and silica gel, the adsorbent material in the second layer is selected from the group consisting of alumina, silica gel, and activated carbon, and the adsorbent material in the third layer is selected from the group consisting of CaX, AgLiX, LiX, and LiNaX.

16. The method of claim 11 wherein the one or more regeneration steps produce reject gas containing a portion of the argon in the feed gas mixture, and wherein a portion of the reject gas is recycled and combined with the feed gas mixture.

17. A method for argon recovery comprising
(a) providing a feed gas mixture comprising argon and methane;
(b) contacting at least a portion of the feed gas mixture with a methane-selective adsorbent in a cyclic pressure swing adsorption process and adsorbing at least a portion of the methane on the adsorbent in a first pressure range above atmospheric pressure to provide a purified argon product and an adsorbent comprising adsorbed methane; and
(c) desorbing the adsorbed methane in one or more regeneration steps effected in a second pressure range between atmospheric pressure and a super-atmospheric pressure below any pressure in the first pressure range, inclusive;
wherein the cyclic pressure swing adsorption process is effected at an average operating temperature of at least about 0° C.

18. A method for argon recovery comprising
(a) providing a feed gas mixture comprising argon, the contaminants nitrogen, oxygen, and one or more hydrocarbons each having one or two carbon atoms, and the contaminant or contaminants hydrogen and/or carbon monoxide;
(b) removing at least a portion of the oxygen by catalytic reaction with hydrogen and/or methane to yield an oxygen-depleted gas enriched in water and/or carbon dioxide;
(c) contacting the oxygen-depleted gas with a bed of getter material wherein at least a portion of the hydrogen and/or carbon monoxide is removed to yield an intermediate gas;
(d) contacting the intermediate gas mixture with adsorbent material in a cyclic pressure swing adsorption process and selectively adsorbing at least a portion of the contaminant gases in a first pressure range above atmospheric pressure to provide a purified argon product and adsorbent material comprising adsorbed contaminants; and
(e) regenerating the adsorbent material comprising adsorbed contaminants in one or more regeneration steps effected in a second pressure range between atmospheric pressure and a super-atmospheric pressure below any pressure in the first pressure range, inclusive;
wherein the cyclic pressure swing adsorption process is effected at an average operating temperature of at least about 0° C.

19. The method of claim 18 wherein the pressure swing adsorption process utilizes at least one adsorber vessel containing three layers of adsorbent material, the first layer comprising an adsorbent that selectively adsorbs water and/or carbon dioxide from argon, a second layer comprising an adsorbent that selectively adsorbs from argon carbon monoxide and/or carbon dioxide and/or one or more hydrocarbons each having one or two carbon atoms, and a third layer comprising an adsorbent that selectively adsorbs nitrogen from argon.

20. The method of claim 19 wherein the adsorbent material in the first layer is selected from the group consisting of alumina and silica gel, the adsorbent material in the second layer is selected from the group consisting of alumina, silica gel, and activated carbon, and the adsorbent material in the third layer is selected from the group consisting of CaX, AgLiX, LiX, and LiNaX.

21. The method of claim 20 wherein the one or more regeneration steps produce reject gas containing a portion of the argon in the feed gas mixture, and wherein a portion of the reject gas is recycled and combined with the feed gas mixture.

22. The method of claim 18 wherein the feed gas comprises water and/or carbon dioxide.

23. The method of claim 18 wherein at least a portion of the purified argon product is utilized in a process which generates the feed gas mixture, and wherein the process is selected from the group consisting of sinter HIPping, vacuum furnace cooling, and argon oxygen decarburization (AOD).

24. An apparatus for argon recovery comprising a pressure swing adsorption system having an inlet, an outlet, and a plurality of parallel adsorber vessels, each adsorber vessel containing adsorbent material adapted for the selective adsorption of nitrogen from a mixture comprising nitrogen and argon and/or selective for the adsorption of methane from a mixture comprising nitrogen and methane, wherein the pressure swing adsorption system is adapted to effect the cyclic steps of (1) adsorbing nitrogen and/or methane on the adsorbent material in a first pressure range above 100 psia to provide a purified argon product and an adsorbent comprising adsorbed nitrogen and/or adsorbed methane and (2) regenerating the adsorbent by desorbing the adsorbed nitrogen and/or the adsorbed methane in a second pressure range between atmospheric pressure and a super-atmospheric pressure below any pressure in the first pressure range, inclusive, to yield reject gas containing argon and desorbed nitrogen and/or methane, and wherein the pressure swing adsorption system is adapted to operate at an average operating temperature of at least about 0° C.

25. The apparatus of claim 24 comprising a catalytic oxidation reactor having an inlet, an outlet, and catalytic material adapted to promote the reaction of oxygen with hydrogen and/or methane, wherein the outlet of the catalytic oxidation reactor is in flow communication with the inlet of the pressure swing adsorption system.

26. The apparatus of claim 25 wherein each adsorber vessel contains adsorbent material adapted to be selective for the adsorption of water and/or carbon dioxide from a mixture comprising water and/or carbon dioxide and also comprising argon and nitrogen.

27. The apparatus of claim 24 comprising a getter vessel having an inlet, an outlet, and a bed of getter material adapted to chemisorb hydrogen and/or carbon monoxide, wherein the outlet of the vessel is in flow communication with the inlet of the pressure swing adsorption system.

28. The apparatus of claim 24 comprising piping adapted to recycle a portion of the reject gas to the inlet of the pressure swing adsorption system.

29. An apparatus for argon recovery comprising
(a) a catalytic oxidation reactor having an inlet, an outlet, and a catalytic material adapted to promote the reaction of oxygen with hydrogen and/or methane;
(b) a getter vessel having an inlet, an outlet, and a bed of getter material adapted to chemisorb hydrogen and/or carbon monoxide, wherein the inlet of the vessel is in flow communication with the outlet of the catalytic oxidation reactor; and
(c) a pressure swing adsorption system having an inlet in flow communication with the outlet of the getter vessel, wherein the pressure swing adsorption system comprises a plurality of parallel adsorber vessels, each adsorber vessel containing adsorbent material selective for the adsorption of gaseous contaminants from argon, wherein the pressure swing adsorption system is adapted to effect the cyclic steps of (1) adsorbing gaseous contaminants on the adsorbent material in a first pressure range above atmospheric pressure to provide a purified argon product and an adsorbent comprising adsorbed contaminants and (2) regenerating the adsorbent by desorbing the adsorbed contaminants in a second pressure range between atmospheric pressure and a super-atmospheric pressure below any pressure in the first pressure range, inclusive, to yield reject gas comprising argon and desorbed contaminants, and wherein the pressure swing adsorption system is adapted to operate at an average operating temperature of at least about 0° C.

30. The apparatus of claim 29 wherein each adsorber vessel comprises three layers of adsorbent material, the first layer comprising an adsorbent adapted to selectively adsorb water and/or carbon dioxide from argon, a second layer comprising an adsorbent adapted to selectively adsorb from argon carbon monoxide and/or carbon dioxide and/or one or more hydrocarbons each having one or two carbon atoms, and a third layer comprising an adsorbent adapted to selectively adsorb nitrogen from argon.

31. The apparatus of claim 29 comprising piping adapted to recycle a portion of the reject gas to the inlet of the pressure swing adsorption system.

* * * * *